(12) United States Patent
Haylock et al.

(10) Patent No.: US 10,514,040 B2
(45) Date of Patent: Dec. 24, 2019

(54) VACUUM SYSTEM

(71) Applicant: EDWARDS LIMITED, Manor Royal, Crawley, West Sussex, Sussex (GB)

(72) Inventors: James Alexander Haylock, Eastbourne (GB); Richard Lee Harkin, Worthing (GB); Ian Keech, Washington (GB); Jian Li, Eastbourne (GB)

(73) Assignee: Edwards Limited, Burgess Hill, West Sussex (GB)

( * ) Notice: Subject to any disclaimer, the term of this patent is extended or adjusted under 35 U.S.C. 154(b) by 269 days.

(21) Appl. No.: 15/310,841

(22) PCT Filed: May 13, 2015

(86) PCT No.: PCT/GB2015/051399
§ 371 (c)(1),
(2) Date: Nov. 14, 2016

(87) PCT Pub. No.: WO2015/177514
PCT Pub. Date: Nov. 26, 2015

(65) Prior Publication Data
US 2017/0218966 A1 Aug. 3, 2017

(30) Foreign Application Priority Data
May 19, 2014 (GB) .................... 1408879.3

(51) Int. Cl.
*F04D 27/00* (2006.01)
*F04D 19/04* (2006.01)
(Continued)

(52) U.S. Cl.
CPC .......... *F04D 27/007* (2013.01); *F04D 17/16* (2013.01); *F04D 19/04* (2013.01); *F04D 19/046* (2013.01);
(Continued)

(58) Field of Classification Search
CPC .......... F04C 25/02; F04C 28/08; F04C 14/08; F04B 39/06; F04B 53/08;
(Continued)

(56) References Cited

U.S. PATENT DOCUMENTS

2002/0131877 A1 9/2002 Omori
2004/0013531 A1* 1/2004 Curry .................... F04D 19/04
417/42

(Continued)

FOREIGN PATENT DOCUMENTS

EP 1211424 6/2002
GB 2492065 A 12/2012
(Continued)

OTHER PUBLICATIONS

English translation of JP2013253502, dated Oct. 10, 2018 from EPO website.*

(Continued)

*Primary Examiner* — Bryan M Lettman
(74) *Attorney, Agent, or Firm* — Westman, Champlin & Koehler, P.A.; Theodore M. Magee

(57) ABSTRACT

A vacuum system includes a vacuum pump and an electric motor for driving the vacuum pump. A cooling arrangement cools the vacuum system. A control performs at least one of decreasing voltage and increasing frequency of a signal applied to the electric motor to decrease an amount of magnetic flux generated in the electric motor instead of decreasing the current applied to the electric motor to arrive at a desired torque generated by the electric motor in response to pumping requirements of the vacuum pump.

12 Claims, 2 Drawing Sheets

(51) Int. Cl.
  *F04D 17/16* (2006.01)
  *F04D 29/58* (2006.01)
  *F04D 25/06* (2006.01)
  *F04B 39/06* (2006.01)
  *F04B 53/08* (2006.01)
  *F04C 25/02* (2006.01)

(52) U.S. Cl.
  CPC ............ *F04D 25/06* (2013.01); *F04D 27/004* (2013.01); *F04D 29/58* (2013.01); *F04D 29/584* (2013.01); *F04B 39/06* (2013.01); *F04B 53/08* (2013.01); *F04B 2203/0203* (2013.01); *F04C 25/02* (2013.01)

(58) Field of Classification Search
  CPC ...... F04B 2203/0202; F04B 2203/0203; F04B 49/06; F04B 49/065; F04B 2203/0209; F04D 17/16; F04D 19/044; F04D 19/046; F04D 19/048; F04D 19/04; F04D 19/042; F04D 27/004; F04D 29/58; F04D 29/5806; F04D 29/5813; F04D 29/584; F04D 15/0066; F04D 27/007; F04D 25/06; H02P 1/00; H02P 1/04; H02P 1/24; H02P 1/26; H02P 1/42; H02P 5/00; H02P 6/04; H02P 6/10; H02P 21/00; H02P 21/0035; H02P 21/005; H02P 21/06; H02P 27/00; H02P 23/00; H02P 27/04; H02P 27/06
  See application file for complete search history.

(56) References Cited

U.S. PATENT DOCUMENTS

| | | | |
|---|---|---|---|
| 2005/0201882 A1* | 9/2005 | Maccarrone | ............ F04B 37/14 417/572 |
| 2010/0303644 A1 | 12/2010 | Moriyama | |
| 2014/0103851 A1 | 4/2014 | Arefeen et al. | |

FOREIGN PATENT DOCUMENTS

| | | | |
|---|---|---|---|
| JP | 2013253502 | * | 12/2013 |
| WO | 2014009375 | | 1/2014 |
| WO | 2014045438 | | 3/2014 |

OTHER PUBLICATIONS

British Search Report dated Nov. 24, 2014 for corresponding British Application No. GB1408899.1.
International Search Report and Written Opinion dated Aug. 4, 2015 in corresponding International Application No. PCT/GB2015/051399.

* cited by examiner

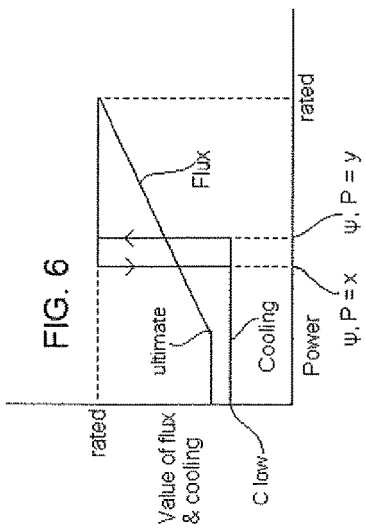
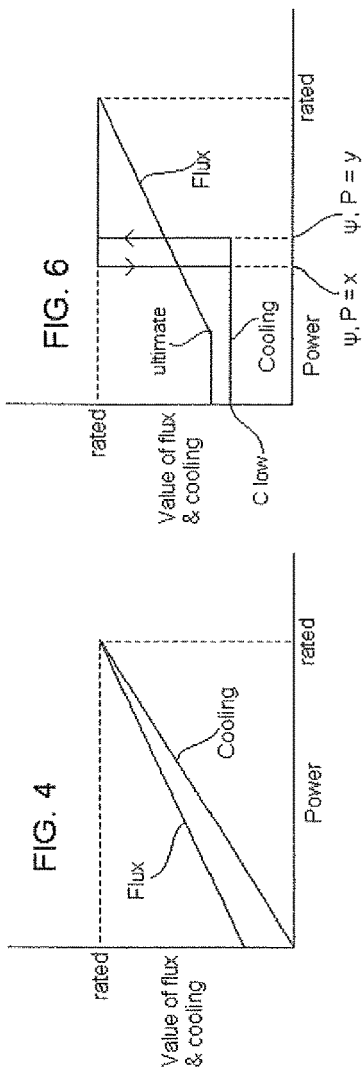
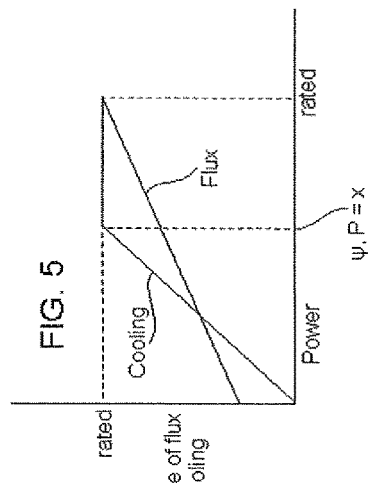
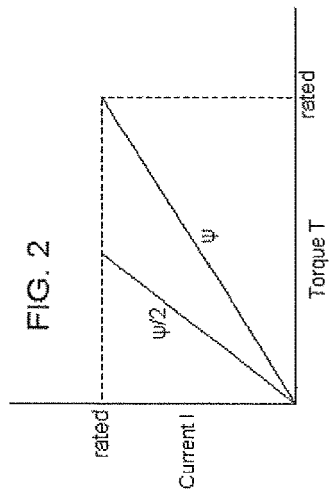
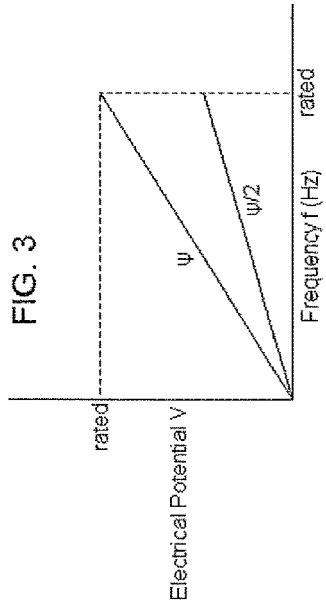

VACUUM SYSTEM

This application is a national stage entry under 35 U.S.C. § 371 of International Application No. PCT/GB2015/051399, filed May 13, 2015, the entire content of which is incorporated herein by reference.

TECHNICAL FIELD OF THE INVENTION

The present invention relates to a vacuum system comprising a vacuum pump and a control of the vacuum pump.

BACKGROUND TO THE INVENTION

Vacuum systems comprise one or more vacuum pumps which are typically operated from an electrical supply, which results in operation at less than 100% efficiency. Lower efficiency causes a higher consumption of electrical power and consequently higher running costs than would be experienced if 100% efficiency were attainable. Losses are emitted in the form of waste heat and transmitted acoustic noise.

Waste heat becomes more problematic in modern vacuum systems where a vacuum pump is built into enclosures containing other pieces of equipment. The waste heat raises the temperature within the enclosure, which reduces the operating envelope of the system and may reduce reliability. The waste heat must be removed a cooling arrangement, typically by fans and then by air-conditioning, adding to overall energy inefficiency and cost.

Transmitted acoustic noise may not be noticeable in all environments but is highly undesirable in for example a quiet laboratory or office environment where hi-tech instruments are used.

SUMMARY OF THE INVENTION

The present invention provides a vacuum system comprising a vacuum pump, an electric motor for driving the vacuum pump, a cooling arrangement for cooling the vacuum system and a control for controlling the power and/or torque generated by the electric motor in response to pumping requirements of the vacuum pump, wherein the control is arranged to control the magnetic flux generated in the electric motor and the value of cooling applied by the cooling arrangement dependent on the values of flux, cooling and power and/or torque.

The value of the flux and cooling may be inter-dependent. In examples of the invention, the cooling value may be controlled dependent on the flux value. Whilst the control is primarily arranged to ensure that the power of the motor meets the pumping requirements of the vacuum pump, the control is configured to control flux and cooling values dependent on environmental considerations, namely, that temperature or noise is reduced to the extent which is permitted.

In this regard, the flux value generated in the motor can be reduced if power requirements are reduced and likewise the cooling value can be reduced with reduced power or flux reductions. A reduction in flux value means that less heat or noise is generated, which consequently allows a reduction in the cooling value.

Other preferred and/or optional aspects of the invention are defined in the accompanying claims.

BRIEF DESCRIPTION OF THE DRAWINGS

In order that the present invention may be well understood, embodiments of the invention, which are given by way of examples only, will now be described with reference to the accompanying drawings, in which:

FIG. 2 is a graph showing current and torque/power of an electric motor for rotating a vacuum pump;

FIG. 3 is a graph showing electrical potential and frequency for an electric motor;

FIG. 4 shows values of flux and cooling, and power for an electric motor;

FIG. 5 shows another example of flux and cooling, and power for an electric motor; and FIG. 6 shows a still further example of flux and cooling, and power for an electric motor.

DETAILED DESCRIPTION OF THE INVENTION

Figure 1:
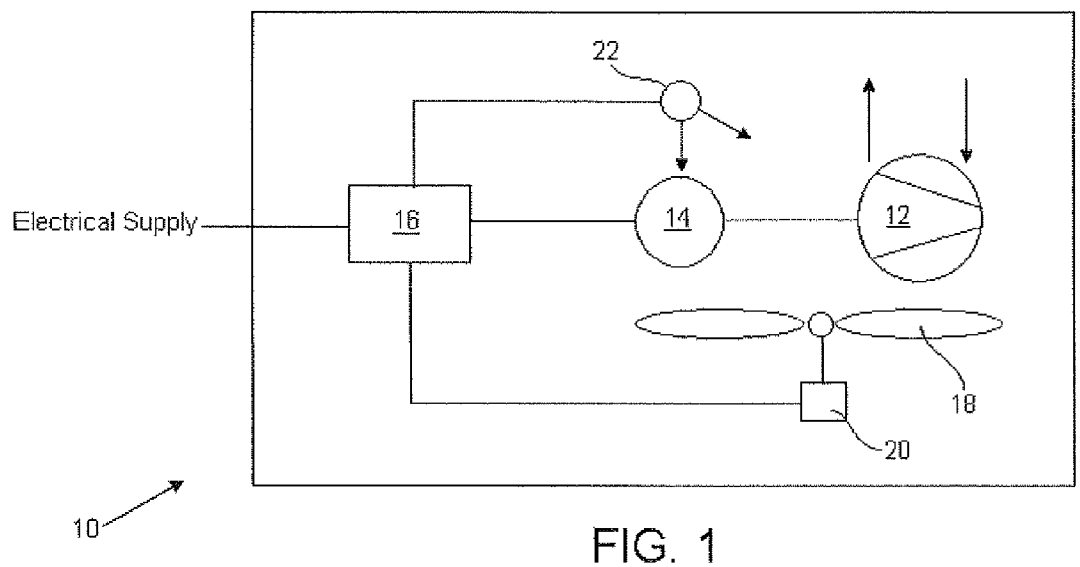
FIG. 1 is a schematic view of a vacuum system.

Referring to FIG. 1, a vacuum system 10 comprises a vacuum pump 12 for evacuating a tool or chamber. Only one pump is shown in FIG. 1 although in other examples more than one pump may be provided in series and/or parallel. For simplicity, a single pump will be referred to in the rest of this application.

The vacuum pump 12 is driven by an electric motor 14 which is typically arranged to rotate one or more rotors of the vacuum pump, dependent on varying pumping requirements. For example, a relatively high gas flow through the pump increases the load on the pump and consequently the motor is required to increase the power to the pump to compensate for the increased load condition. A relatively low gas flow decreases the load on the pump and consequently the power drawn by the motor will decrease commensurate with reduced loading.

Electrical energy for driving the motor 14 is supplied from an electrical supply, typically a mains electrical supply. A control 16 controls the transfer of energy to the motor. The control is typically a power electronic controller, which comprises a rectifier for converting AC electrical energy from the supply to DC energy and an inverter for converting DC energy into an appropriate AC form for controlling rotation by the motor. Hereto, the control 16 controls the voltage applied and hence the current passing through the coils of the motor, which interacts with a magnetic flux to produce the mechanical power which is supplied to the pump in response to pumping requirements, in accordance with Lentz equation. That is, if the load on the pump increases the current in the motor is increased to provide increased mechanical power whereas if the load on the pump decreases the current in the motor is reduced to decrease the mechanical power supplied to the pump.

The conversion of energy from the supply by the control 16 and transfer of the electrical to mechanical energy by the motor 14 is less than 100% efficient and the losses produce heat and noise. In particular, the motor produces both copper and iron losses, in addition to frictional losses.

The heat produced by the vacuum system is removed by a cooling arrangement, which in FIG. 1 comprises a fan 18 driven by a fan motor 20. In other examples the fan may be replaced by cooling fluid the circulation of which is controlled by an auxiliary pump and/or valve system.

In FIG. 1, the fan motor 20 is operatively connected to control 16 for controlling the fan 18. Ordinarily, cooling of a system is controlled solely dependent on temperature, typically in a binary mode by a fan being switched on when the temperature rises and off when the temperature reduces. Generally in vacuum systems a fan or other cooling arrangement is continually in an 'On' state independent of temperature in anticipation of an average amount of cooling that is required. In the present example, operation of the fan is dependent on other characteristics of the vacuum system, in addition to temperature, as explained in more detail below.

As indicated above the load on the vacuum pump 12 varies depending particularly on the amount of gas which is required to be pumped and the pressure of the gas, in addition to other factors, In high load conditions, the mechanical power supplied to the pump is at or close to the rated power of the motor 14. The term "rated power" is a term well known to the skilled person, but for the avoidance of doubt should be understood to mean that sustained operation above rated power would result in failure of the motor and in some circumstances operation above rated power could result in immediate failure. A motor which is not operated above rated power will eventually fail if not maintained, but failure in these circumstances is due to the expected lifetime of the motor and not because the motor is exposed to conditions outside of its design parameters. The term "rated" applies in a similar way to other characteristics, such as current, electrical potential, flux and cooling in this application.

In the FIG. 1 example, when the power required by the vacuum pump is reduced below the rated power, the magnetic flux of the motor is reduced. As indicated above, it is typical in vacuum systems that it is not the flux that is reduced but instead that the current of a motor is reduced when power reduces below the rated power. The advantage of reducing the flux in the present example is that iron losses are reduced, particularly because at reduced operating power, iron losses constitute a greater inefficiency than copper losses, the latter of which are due to current flowing through the motor coils. Whilst a reduction in flux requires increased current to provide the same power, the increased copper losses can be compensated by a small increase in the current, over and above the current that is required with full flux, to compensate for the reduced flux.

FIGS. 2 and 3 show graphs for an induction motor, operated using a volts-hertz also known as V/f control, with applied electrical potential V on the y-axis and frequency fin hertz on the x-axis in FIG. 3 and motor current I on the y-axis and mechanical torque T on the x-axis in FIG. 2. It should be noted that for practical purposes torque T and power P can be considered to be equivalent at a given operating frequency. In both of these examples two lines are shown for full or rated magnetic flux ψ and for a reduced magnetic flux ψ/2. These lines are exemplary and the flux may be decreased from any value between full or rated flux and any flux down to zero flux, although very low values of flux tend to result in excessive currents and unstable operation so are usually avoided—see FIGS. 4 to 6 in this regard.

Flux is reduced by reducing the electrical potential applied to the motor as shown in FIG. 3 relative to the frequency. The ψ/2 line on this graph shows how potential increases more slowly towards rated frequency compared with the ψ line.

In accordance with FIG. 2 when the power requirements of the motor are reduced due to decreased loading on the pump, the flux ψ can be reduced. The reduction in flux produces a reduction in energy losses and therefore the amount of heat that is generated by the system. To compensate for reduced flux, current increases to provide the same torque or power.

Therefore, when load on the pump changes for example when the amount of gas that the pump is required to evacuate from a tool or chamber changes, the flux is adjusted to reduce losses in the system, particularly iron losses, which manifest in the form of heat. When these losses are removed, the temperature of the system is reduced or at least does not increase compared to the temperature that would normally be expected if current alone were controlled in response to the changing power required or the load conditions on the pump. Therefore, as cooling is required to reduce the temperature of system, the amount of cooling applied can be made dependent on the flux controlled in the motor and not solely dependent on temperature, or as is more usual, that cooling is applied continuous regardless of temperature.

In examples of the invention, in a high load condition of the pump it is required that the flux of the motor 14 is at maximum or rated flux and in this condition the cooling applied to the system is also at maximum or at its rated value. When the load on the pump is reduced, for example at "ultimate" when the pump is merely maintaining pressure, the flux of the motor 14 can be reduced and consequently the amount of cooling can be reduced.

In its simplest form, motor flux and cooling is shown in FIG. 4, where the value of flux and cooling are represented on the y-axis and motor power is represented on the x-axis. As shown, both flux and power reduce from their rated values at rated power. This graph shows that cooling and flux are related but may of course reduce at different rates, even though one value is dependent on the other value and in this example proportional. In other examples, cooling and flux may be dependent over only part of the graph.

It should be noted that it is undesirable to reduce flux to zero. In this regard, flux is shown as a positive value at minimum power on the y-axis, whereas cooling can be reduced to zero at minimum power (i.e. the origin in the graph).

In this way, as the load on the pump varies, the flux of the motor can be changed to decrease losses in the system and as a result of the decreased losses the cooling required is reduced. Looking at the example from a different perspective, if the cooling required is reduced the flux of the motor can also be reduced since a decreased requirement for cooling also represents a decreased requirement for power and hence flux.

Another example of the invention is shown in FIG. 5 where again the values of flux and cooling are represented on the y-axis and motor power is represented on the x-axis. In this example, the value of the cooling is maintained despite an initial reduction of power, whilst flux is reduced over the same reduction in power. In this way, cooling is independent of flux over an initial reduction from rated power. There may be residual heat in the system before cooling can be reduced, but at the same time flux can be decreased (as power has been reduced) to reduce the amount of heat added to the system. Cooling is reduced when a predetermined flux ψ and/or power P equals x (as shown ψ, P=x in FIG. 5). At power or flux below x, cooling is reduced in proportion to the reduction in flux.

A still further example of the invention shown in FIG. 6, where again the values of flux and cooling are represented on the y-axis and motor power is represented on the x-axis. In this example, cooling is maintained at its rated value until flux ψ and/or power P equals x, similarly to the example shown in FIG. 5. There are two differences between this example and the previous example. Firstly, the reduction in cooling at x, whilst dependent on the value of the flux, is not proportional to the flux. Instead, cooling is supplied at its rated value or alternatively at a lower value shown on the graph $C_{low}$. When flux reduces below x the amount of cooling applied to the system is reduced to $C_{low}$.

Referring still to FIG. 6, it would be undesirable if cooling were to repeatedly fluctuate between rated value and $C_{low}$, and therefore hysteresis is built into the system so that cooling is increased from $C_{low}$ to its rated value only at an increased value of power or flux, as shown in FIG. 6 where ψ, P=y.

It is additionally shown in the example of FIG. 6 that flux is reduced from its rated value in proportion to a reduction in power from its rated value. However at the point marked ultimate on the graph further reduction in power does not result in a further reduction in flux. In a typical vacuum pumping system the vacuum pump is required to operate between rated power which is the power required at a high load condition and ultimate power which is the power required to maintain a vacuum tool or chamber at a given pressure. At ultimate, there is a much reduced quantity of gas that is being pumped and such gas that is pumped is generally due to leaks within the system.

It is normally the case in vacuum systems that the speed of rotation of the pump is maintained generally constant. Adjustment of the speed in response to varying pumping requirements is slow, whereas adjustment of power is much quicker. For example, increasing the rotational speed of a pump to meet increased load takes a longer time than increasing power. The rotational speed is not though maintained entirely constant because for example and increased load results in a small reduction in speed which is subsequently increased following an increase in power.

Reduction of the speed has the effect of increasing the ultimate pressure which is undesirable in some applications. There are however circumstances in which reduced speed is desirable for example because a speed reduction reduces energy consumption under sustained low load conditions. If it is anticipated that the load will remain low for a prolonged period, speed may reduced to conserve energy and increased prior to an anticipated high load condition.

Reduction of motor flux reduces the amount of torque generated by a given current and hence reduces the ability of the motor to accelerate from a reduced speed back to the rated speed. Reducing flux at low speeds also reduces the motor's ability to handle unexpected loads and can result in unstable current and/or speed control. For these reasons the amount of flux reduction applied may be reduced according to the commanded operating speed of pump motor. In these cases the control may reduce the cooling in according to the power reduction and/or operating temperature even though the motor flux has not reduced in low speed operation.

Referring again to the example shown FIG. 1, the control 16 may be arranged to receive an input from a sensor 22, shown as a single sensor although more than one sensor may be provided. The sensor senses one or more characteristics of the vacuum system, particularly of the motor 14 or the pump 12. The received input from the sensor may be arranged to control one or both of the flux of motor 14 or the amount of cooling applied, which in this example is the rotational speed of fan 18.

The sensor 22 may be arranged to sense the temperature of the vacuum system or the temperature of one or more components of the vacuum system. For example as previously shown in FIGS. 5 and 6, the temperature of the system may remain at a level which requires continued cooling even though the flux of motor 14 has been reduced to conserve energy. The sensor input to control 16 may be used for example to control the power or flux value x in FIG. 5, or the power or flux value x and y in FIG. 6, at which cooling is maintained or reduced. Therefore, cooling of the system is dependent on flux, but also dependent on other characteristics of the vacuum system, including temperature.

The invention claimed is:

1. A vacuum system comprising: (a) a vacuum pump; (b) an electric motor for driving the vacuum pump; (c) a cooling arrangement for cooling the vacuum system; and (d) a control for performing at least one of decreasing voltage and increasing frequency of a signal applied to the electric motor to decrease an amount of magnetic flux generated in the electric motor instead of decreasing the current applied to the electric motor to arrive at a desired torque generated by the electric motor in response to pumping requirements of the vacuum pump.

2. The vacuum system of claim 1, wherein the control further controls the cooling arrangement by setting a cooling value for the cooling arrangement and wherein the cooling value is dependent on the amount of magnetic flux generated in the electric motor and on at least one other characteristic of the vacuum system.

3. The vacuum system of claim 2, wherein said at least one other characteristic is a temperature of the system.

4. The vacuum system of claim 1, wherein the amount of magnetic flux of the electric motor is reduced at least in part in proportion to a reduction in power or torque required by the vacuum pump.

5. The vacuum system of claim 1, wherein the control is arranged to generate a rated magnetic flux in the electric motor at a rated power or torque requirement of the electric motor and a reduced magnetic flux at a power less than the rated power or a torque less than the rated torque.

6. The vacuum system of claim 5, wherein the reduced magnetic flux is generated at a power or torque of the electric motor that results from operation at ultimate vacuum.

7. The vacuum system of claim 1, wherein the control further controls the cooling arrangement by setting a cooling value for the cooling arrangement and wherein the cooling value is proportional at least in part to the magnetic flux generated in the electric motor.

8. The vacuum system of claim 1, wherein the control further controls the cooling arrangement by setting a cooling value for the cooling arrangement and wherein the cooling value is maintained at a first value for all magnetic flux values above a first predetermined value of magnetic flux or for all power values above a first predetermined value of power.

9. The vacuum system of claim 8, wherein the cooling value is maintained at a second value for all magnetic flux values below a second predetermined value of magnetic flux or for all power values below a second predetermined value of power.

10. The vacuum system of claim 9, wherein the cooling value is increased from the second value to the first value when the magnetic flux increases to the first predetermined value of magnetic flux or when the power increases to the first predetermined value of power.

11. The vacuum system of claim 1, wherein the cooling arrangement comprises a fan driven by a fan motor and the control is arranged to control the fan motor to vary a speed of the fan.

12. The vacuum system of claim 1, wherein the cooling arrangement comprises a cooling fluid circulation system and the control is arranged to control at least one of a temperature of the fluid, a pump for causing circulation of the fluid or a valve arrangement for allowing circulation of the fluid.

* * * * *